United States Patent
Mossoba et al.

(10) Patent No.: US 11,055,718 B2
(45) Date of Patent: Jul. 6, 2021

(54) METHODS AND SYSTEMS FOR ALLOWING AN ELECTRONIC PURCHASE UPON COMPLETION OF AN EXERCISE AND/OR ACTIVITY GOAL

(71) Applicant: Capital One Services, LLC, McLean, VA (US)

(72) Inventors: Michael Mossoba, Arlington, VA (US); Abdelkader M'Hamed Benkreira, New York, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/567,891

(22) Filed: Sep. 11, 2019

(65) Prior Publication Data

US 2021/0069549 A1    Mar. 11, 2021

(51) Int. Cl.
*G06Q 20/40* (2012.01)
*A63B 24/00* (2006.01)

(52) U.S. Cl.
CPC ......... *G06Q 20/405* (2013.01); *G06Q 20/40* (2013.01); *A63B 24/0006* (2013.01); *A63B 24/0059* (2013.01); *A63B 24/0062* (2013.01); *A63B 24/0087* (2013.01); *A63B 2024/0012* (2013.01)

(58) Field of Classification Search
CPC ......... A63B 24/0059; A63B 24/0006; A63B 24/0062; A63B 24/0087; A63B 24/0012; G06Q 20/405; G06Q 20/40; G06Q 20/401
See application file for complete search history.

(56) References Cited

U.S. PATENT DOCUMENTS

| | | | |
|---|---|---|---|
| 9,450,958 B1* | 9/2016 | Saylor | H04L 63/0884 |
| 2002/0055419 A1* | 5/2002 | Hinnebusch | G09B 19/003 482/8 |
| 2003/0009367 A1* | 1/2003 | Morrison | G06F 19/326 705/7.33 |
| 2004/0127336 A1* | 7/2004 | Lapcevic | A63B 71/0622 482/8 |
| 2009/0144639 A1* | 6/2009 | Nims | A61B 5/1118 715/757 |

(Continued)

OTHER PUBLICATIONS

Blocksite, "Block Site—Block Distracting Apps & Sites", https://play.google.com/store/apps/details?id=co.blocksite&hl=en_US, Jan. 1, 2019, 2 pages.

(Continued)

*Primary Examiner* — Sundhara M Ganesan
(74) *Attorney, Agent, or Firm* — DLA Piper LLP US (57) ABSTRACT

Methods and systems are disclosed for allowing an electronic purchase upon completion of an exercise goal and/or a physical activity goal. Exercise and/or physical activity goal criteria can be retrieved for a user. Electronic charge approval criteria can be retrieved for the user, the electronic charge approval criteria based on the exercise and/or physical activity goal criteria. It can be determined whether the exercise and/or physical activity goal criteria has been fulfilled using an electronic measurement system, the electronic measurement system measuring motion data and/or heart rate data for the user. A requested electronic charge can be authorized upon a determination that the electronic charge approval criteria for the user has been fulfilled.

13 Claims, 4 Drawing Sheets

(56) References Cited

U.S. PATENT DOCUMENTS

| | | | |
|---|---|---|---|
| 2009/0150178 A1* | 6/2009 | Sutton | A61B 5/222 705/2 |
| 2009/0171788 A1* | 7/2009 | Tropper | G07F 17/3244 705/14.61 |
| 2012/0041767 A1* | 2/2012 | Hoffman | G06Q 50/20 705/1.1 |
| 2016/0063532 A1* | 3/2016 | Loeb | G06Q 20/209 705/14.25 |
| 2016/0092654 A1* | 3/2016 | Bryant, II | G06F 19/3481 705/44 |
| 2016/0339298 A1* | 11/2016 | Kats | A61B 5/4866 |
| 2017/0041454 A1 | 2/2017 | Nicholls et al. | |
| 2017/0189815 A1 | 7/2017 | Tweedale et al. | |
| 2017/0216670 A1* | 8/2017 | Kuroda | A63F 13/24 |
| 2018/0247241 A1 | 8/2018 | Avrahami et al. | |
| 2018/0278691 A1* | 9/2018 | Vergara, Jr. | H04L 67/12 |
| 2018/0349583 A1 | 12/2018 | Turgeman et al. | |
| 2018/0374386 A1* | 12/2018 | Benefield | A63B 71/0686 |
| 2019/0019426 A1 | 1/2019 | Chambers | |
| 2019/0075128 A1 | 3/2019 | Roosenraad et al. | |
| 2019/0134463 A1* | 5/2019 | Ma | A63B 24/0062 |
| 2019/0290965 A1* | 9/2019 | Oren | G06Q 20/1235 |

OTHER PUBLICATIONS

U.S. Appl. No. 16/425,157, filed May 29, 2019, Pending.
U.S. Appl. No. 16/179,278, filed Nov. 2, 2018, Pending.

\* cited by examiner

METHODS AND SYSTEMS FOR ALLOWING AN ELECTRONIC PURCHASE UPON COMPLETION OF AN EXERCISE AND/OR ACTIVITY GOAL

FIELD

The present disclosure relates generally to allowing an electronic purchase upon completion of an exercise and/or physical activity goal.

BACKGROUND

Users often need help to meet their exercise and/or physical activity goals. There is a need to help provide incentives to help users meet their goals.

SUMMARY OF THE DISCLOSURE

In some aspects of the disclosure, a computer-implemented method can be provided for allowing an electronic purchase upon completion of an exercise and/or physical activity goal. (While the term "exercise" is often used in this disclosure, it should be noted that the term exercise can cover any type of exercise and/or physical activity (e.g., sleeping, meditating, etc.)) Exercise goal criteria for a user can be retrieved. Electronic charge approval criteria for the user can be retrieved, wherein the electronic charge approval criteria can be based on the exercise goal criteria. The computer system can determine whether or not the exercise goal criteria has been fulfilled using an electronic measurement system in communication with the computer system. The electronic measurement system can measure motion data and/or heart rate data for the user. A requested electronic charge can be authorized upon a determination that the electronic charge approval criteria for the user has been fulfilled.

In some aspects of the disclosure, the computer system can determine whether the requested electronic charge is for a product and/or service from a pre-determined entity.

In some aspects of the disclosure, the computer system can determine whether the requested electronic charge is within a predetermined price range for a product and/or service from a pre-determined entity.

In some aspects of the disclosure, the exercise goal criteria can include walking a predetermined amount of steps within a predetermined amount of time. In some aspects of the disclosure the exercise goal criteria can be sleeping and/or meditating for a certain amount of time. In some aspects of the disclosure, the exercise goal criteria can include obtaining a predetermined heart rate for a predetermined amount of time. In some aspects of the disclosure, the exercise goal criteria can include a predetermined day and/or a predetermined time when exercise must take place.

In some aspects of the disclosure, a computer-implemented system for allowing an electronic purchase upon completion of an exercise activity can be provided. A processor that executes the instructions can be configured for: retrieving exercise activity criteria for a user; retrieving electronic charge approval criteria for the user, the electronic charge approval criteria based on the exercise activity criteria; determining whether the exercise activity criteria has been met using an electronic measurement system; and authorizing a requested electronic charge upon a determination that the electronic charge approval criteria for the user has been met.

In some aspects of the disclosure, the processor can be configured for: declining the requested electronic charge upon a determination that the electronic charge approval criteria has not been met. In some aspects of the disclosure, the processor can be configured for: disabling the electronic charge approval criteria upon fulfilment of predetermined disabling criteria. The disabling criteria can include receipt of a disabling approval from a designated person and/or designated electronic contact information. The designated electronic contact information can include a phone and/or an email address. In some aspects, the designated person can include a customer service representative, a fitness and/or health coach, etc. In some aspects, the designated person can include a friend and/or family member of a user.

In some aspects of the disclosure, a device for allowing an electronic purchase upon completion of an exercise activity can be provided. A processor for executing instructions can be configured for: retrieving exercise activity rule conditions for a user; retrieving electronic charge approval rule conditions for the user based on the exercise activity rule conditions; determining whether the exercise activity rule conditions for the user have been met using metrics measured by an electronic measurement system; and authorizing a requested electronic charge upon a determination that the electronic charge approval rule conditions for the user have been met.

In some aspects of the disclosure, the electronic measurement system can be a component and/or a mobile application for a mobile phone device. In some aspects of the disclosure, the electronic measurement system can be a smart fitness device.

In some aspects of the disclosure, the processor can be configured for: determining whether the requested electronic charge is within a predetermined price range for a product and/or service from a pre-determined entity.

In some aspects of the disclosure, the exercise and/or physical activity rule conditions can include walking a predetermined amount of steps within a predetermined amount of time. The exercise activity rule conditions can include obtaining a predetermined heart rate for a predetermined amount of time. The exercise activity rule conditions can include a predetermined day and/or a predetermined time when a predetermined activity must take place.

DETAILED DESCRIPTION

Embodiments of the present disclosure may allow an electronic purchase upon completion of an exercise goal. Users may need assistance in meeting exercise goals. In some embodiments, the disclosed system can help users meet their exercise goals by only allowing an electronic charge upon a determination that an exercise goal has been achieved.

Figure 1:
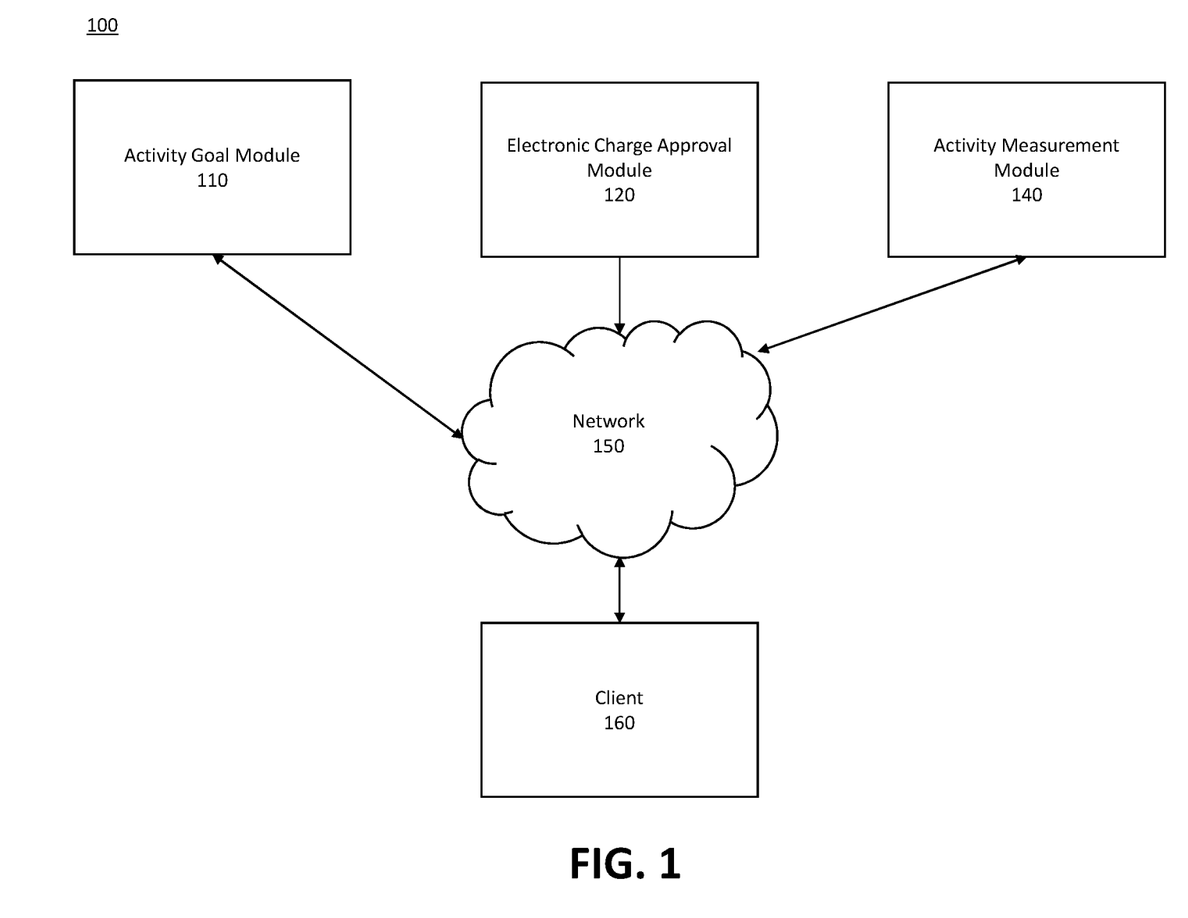
FIGS. 1-2 are diagrams of an illustrative system for allowing an electronic purchase upon completion of an exercise goal, according to aspects of the disclosure.

FIG. 1 is a diagram of an illustrative system 100 for allowing an electronic purchase upon completion of an exercise goal. For example, as shown in FIG. 1, an activity goal module 110 can accept activity goal information for a user on a client 160 (e.g., a computer device). An electronic charge approval module 120 can accept electronic charge approval criteria that can be based on the exercise goal criteria. A requested electronic charge can be authorized by the electronic charge approval module 120 upon a determination that the electronic charge approval criteria for the user has been fulfilled. An activity measurement module 140 can measure activity data for the user, such as but not including motion data and/or heart rate data for the user.

Figure 2:
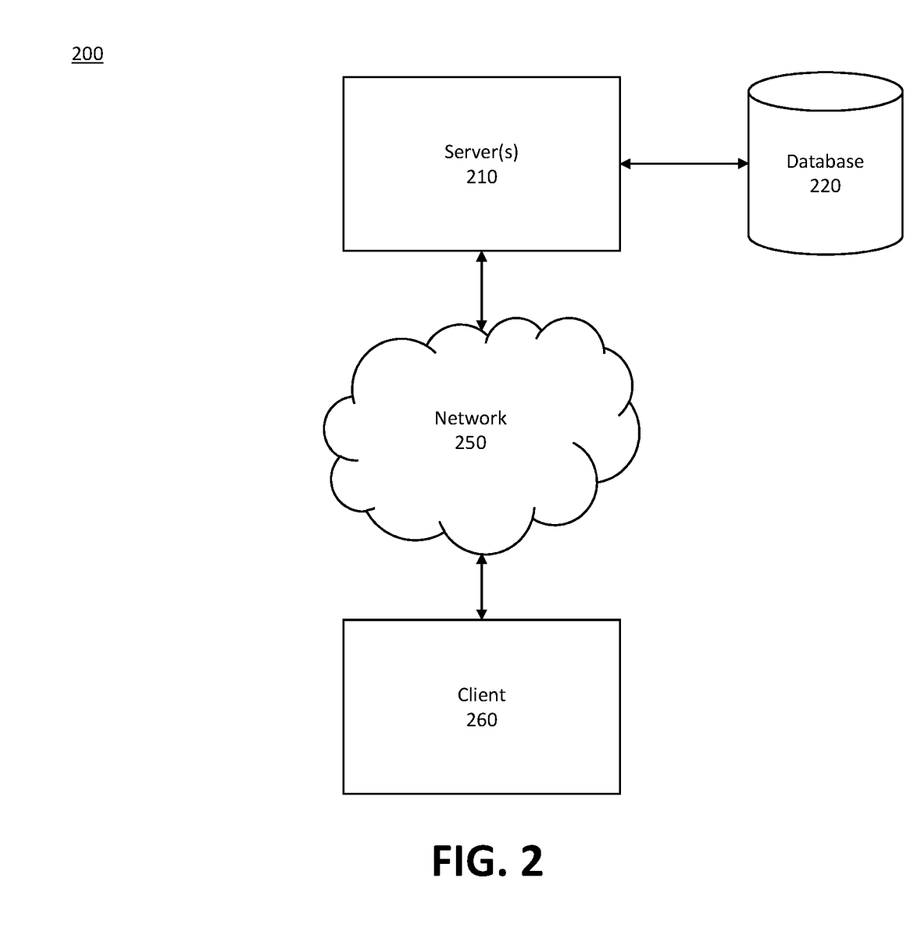

FIG. 2 is a diagram of an illustrative system 200 for allowing an electronic purchase upon completion of an exercise goal. A client 200 (e.g., a computer device) can communicate (e.g., thru a network 250) with a server 210. The server 210 can communicate with a database 220. In some embodiments, activity goal information and/or electronic charge approval information can be stored and/or updated in the database.

Figure 3:
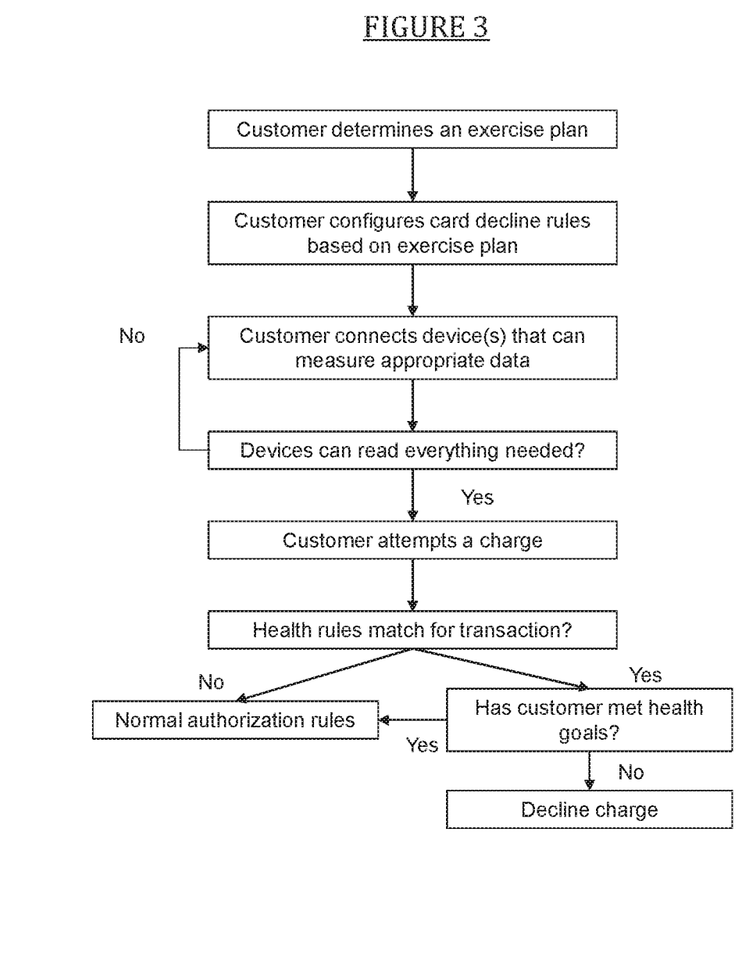
FIG. 3 is a flow diagram showing processing that may occur within the systems of FIGS. 1 and 2 to allow an electronic purchase upon completion of an exercise goal, according to aspects of the disclosure.

FIG. 3 is a flow diagram showing processing that may occur within the systems of FIGS. 1 and 2 to allow an electronic purchase upon completion of an exercise goal. In step 305, a user (e.g., customer) can determine an exercise plan. In step 310, a customer can configure credit and/or debit card decline rules based on an exercise plan. For example, the customer can indicate that items over a certain dollar amount can be purchased at certain stores upon completion of a designated physical activity and/or the customer can indicate that items with certain merchant codes can only be purchased upon completion of a designated physical activity. In step 315, a customer can connect a device (e.g., an iPhone, a Smart Watch, etc.) that can measure activity data and/or health data. In step 320, the device can determine if it can read the needed information (e.g., activity data and/or health data for the customer). (Note that the term "customer" can include any persons that the customer has on their account, such as, but not limited to, a dependent, a child, a spouse, a significant other, a friend, etc.) If not, the method can return to step 315. If yes, the process can move to step 325. In step 325, the customer can attempt to make a charge with a credit card and/or debit card. In step 330, the system can determine whether the attempted charge is authorized (e.g., whether or not the activity/health rules match for the transaction to be authorized). If not, the process can move to step 335 where normal authorization rules can apply. If yes, the process can move to step 340, where it can be determined whether the customer has met their health goals. If yes, the process can return to step 335. If not, the process can move to step 345, where a charge can be declined.

As indicated above, a requested electronic charge can be declined upon a determination that the electronic charge approval criteria has not been met. In some aspects of the disclosure, the electronic charge approval criteria can be disabled upon fulfilment of predetermined disabling criteria. The disabling criteria can include receipt of a disabling approval from a designated person and/or designated electronic contact information. The designated electronic contact information can include a phone and/or an email address. In some aspects, the designated person can include a customer service representative, a fitness and/or health coach, etc. In some aspects, the designated person can include a friend and/or family member of a user.

In the methods and systems described herein, customers can add an incentive related to their credit card purchases to modify their behavior. Performance of a desired behavior can allow a user to purchase desired items (e.g., coffee, ice cream, clothes, etc.) For example, upon a determination that a desired behavior has been accomplished, a user can be allowed to: purchase an item at a particular store, purchase an item that has a particular merchant code, or purchase something for a certain amount, or any combination thereof. For example, a certain activity can be measured (e.g., a number of steps, a certain heartbeat, an image mapping of veins, a rate of speed, sweating, eating, sleeping, meditating, etc.) using a variety of systems (e.g., nutrition tracking application, a blood reader, a smart fridge, a gyroscope, a smart watch, a smart phone, a blood tracker, etc.). In some aspects of the disclosure, data can be streamed to the system and/or the application programming interface (API) can be called by the system in a normal cadence. In a different embodiment, users may be more likely to make a coffee or other purchase at Starbucks or another store (one of their predesignated merchants) between 8 and 10 AM local time. This purchase can be tracked using store information (e.g., a name, abbreviation, number, code, etc.) and/or a merchant code. The system may call the API more frequently during this 8-10 AM time. In some aspects of the disclosure, the system can also call external sources and/or external sources can push information to the system (e.g., upon certain criteria, such as accomplishment of a required activity, being met).

When using the merchant code information, the system can allow purchases for transportation and/or healthcare, but not restaurants and/or entertainment as dictated by the rules. In addition, the system can whitelist and/or blacklist certain merchants (e.g., always allow Netflix subscription charges, but only allow a J. CREW transaction if the rule conditions are met).

In some aspects of the disclosure, the system can let the user know whether they have met their goals so they are not surprised with a decline. For example, push notifications can be sent to the user when the user has met a goal. As another example, a banking and/or credit card app can tell the user if they've met their goal when it is first opened or as a tag or option on the app.

Methods described herein may represent processing that occurs within a system for allowing an electronic purchase upon completion of an exercise goal. The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors (e.g., processor 410 in FIG. 4) executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Figure 4:
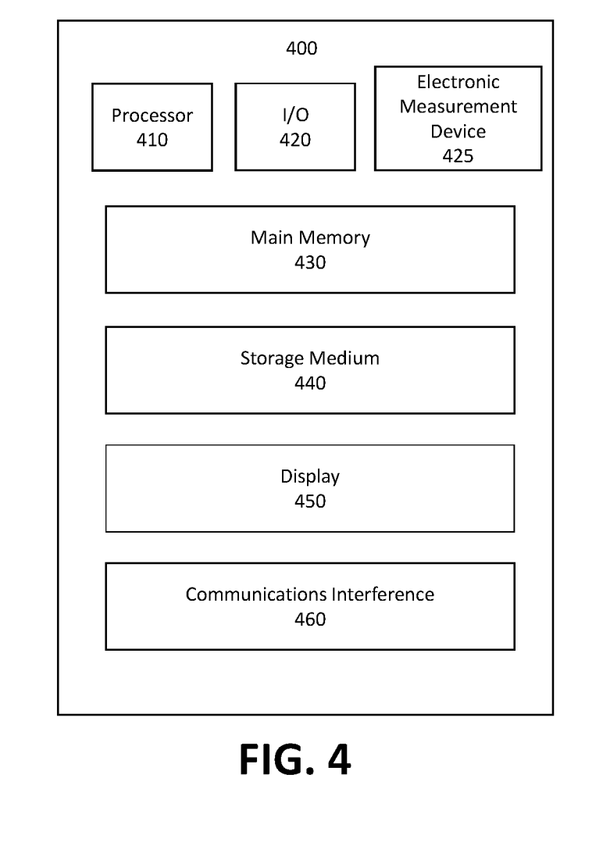
FIG. 4 illustrates an example computer, according to some aspects of the present disclosure.

FIG. 4 illustrates an example computer 405, according to some embodiments of the present disclosure. Computer 405 can include a processor 410 suitable for the execution of a computer program, and can include, by way of example, both general and special purpose microprocessors, and any one or more processor of any kind of digital computer. A processor can receive instructions and data from a memory 430 (e.g., a read only memory or a random access memory or both). Processor 410 can execute instructions and the memory 430 can store instructions and data. A computer can include, or be operatively coupled to receive data from or transfer data to, or both, a storage medium 440 for storing data (e.g., magnetic, magneto optical disks, or optical disks). Information carriers suitable for embodying computer program instructions and data can include all forms of non-volatile memory, including by way of example semiconductor memory devices, such as EPROM, EEPROM, flash memory device, or magnetic disks. The processor 410 and the memory 430 can be supplemented by, or incorporated in, special purpose logic circuitry.

The computer 405 can also include an input/output 420, a display 450, and a communications interface 460.

Detailed Examples

As described above, many types of systems can be used to track whether health goals have been reached. The following examples are illustrative of how the methods and systems described herein may be used.

For example, a nutrition tracking application (e.g., on a smart phone, a smart watch, etc.) can be used to track calories, carbs, fat, etc. consumed by a user, and a rule can be set up where the user can only use a credit card for card present transactions (e.g., where the user needs to show the card at a physical store) if the user met their eating goal the previous day. Thus, for example, if the user's goal was to eat less than 40 carbs per day, if the user tried to use the physical credit card at a physical store on a Tuesday, the activity goal module 110 can check with the activity measurement module 140 to see if the user had eaten less than 40 carbs on Monday. The activity measurement module 140 can communicate with the nutrition tracking application to determine if the user consumed less than 40 carbs on Monday. (For example, the nutrition tracking application can allow a user to enter all food and/or drink consumed (e.g., as the user consumes or at the end of the day) in a certain time period (e.g., a day) and can keeps track of the consumed carbs.) (See, for example, Wikipedia's Sep. 3, 2019 Fitness App description at https://en.wikipedia.org/wiki/Fitness_app, which describes how a fitness app can track calories, and which is herein incorporated by reference in its entirety.) If the activity measurement module 140 determines that the user consumed less than 40 carbs on Monday, the electronic charge approval module 120 can approve the user's attempted purchase.

As another example, a blood tracker (e.g., a blood glucose monitoring device) can be used to track the amount of sugar in a user's blood, and a rule can be set up where the user can only use a credit card for purchases on Amazon if the user's blood sugar meets the user's blood sugar goal. Thus, for example, if the user's goal was to have a certain blood sugar level, if the user tried to use the physical credit card at an electronic and/or physical store, the activity goal module 110 can check with the activity measurement module 140 to see if the user had met the user's goal. The activity measurement module 140 can communicate with the blood tracker to determine if the user's blood level was at the desired level, or within a pre-determined range. (See, for example, Wikipedia's Sep. 3, 2019 Blood Glucose Monitoring description at https://en.wikipedia.org/wiki/Blood_glucose_monitoring, which is herein incorporated by reference in its entirety.) If the activity measurement module 140 determines that the user's blood level is in the goal range, the electronic charge approval module 120 can approve the user's attempted purchase at Amazon.

As a further example, a smart fridge can be used to track calories, carbs, fat, etc. in food and beverages consumed by a user, and a rule can be set up where the user can only use a credit card for a purchase for over $200 at Tiffany if the user met their eating goal every day for the previous month. Thus, for example, if the user's goal was to eat less than 40 carbs per day, if the user tried to use the credit card at Tiffany, the activity goal module 110 can check with the activity measurement module 140 to see if the user had eaten less than 40 carbs every day for the last 30 days. The activity measurement module 140 can communicate with the smart fridge to determine if the user consumed less than 40 carbs every day for the last 30 days. (See, for example, Wikipedia's Sep. 3, 2019 Smart Refrigerator description at https://en.wikipedia.org/wiki/Smart_refrigerator, which is herein incorporated by reference in its entirety.) If the activity measurement module 140 determines that the user consumed less than 40 carbs every day for the last 30 days, the electronic charge approval module 120 can approve the user's attempted purchase at Tiffany.

As an additional example, a fitness tracking application (e.g., on a smart phone, a smart watch, etc.) can be used to track steps taken by a user, and a rule can be set up where the user can only use a credit card for card present transactions (e.g., where the user needs to show the card at a physical store) at Lululemon if the user met their step goal the previous day. Thus, for example, if the user's goal was to take 10,000 steps, if the user tried to use the physical credit card at a physical store on a Tuesday, the activity goal module 110 can check with the activity measurement module 140 to see if the user had taken 10,000 steps or more on Monday. The activity measurement module 140 can communicate with the fitness tracking application to determine if the user walked more than 10,000 steps on Monday. (See, for example, Wikipedia's Sep. 3, 2019 Fitness App description at https://en.wikipedia.org/wiki/Fitness_app, which describes how a fitness app can track steps, and which is herein incorporated by reference in its entirety.) If the activity measurement module 140 determines that the user walked more than 10,000 steps on Monday, the electronic charge approval module 120 can approve the user's attempted purchase.

As an additional example, a gyroscope or heart rate monitor can be used to track the velocity or heart rate of a user, and a rule can be set up where the user can only use a credit card for purchases at an electronic store (e.g., eBay) or a physical store (e.g., Starbucks) if the user met their velocity or heart rate goal the previous day. Thus, for example, if the user's goal was to run over 3 miles an hour for 30 minutes, or get the user's heart rate over a certain amount for 30 minutes, if the user tried to use the physical credit card at the electronic store and/or the physical store on a particular day, the activity goal module 110 can check with the activity measurement module 140 to see if the user had met the user's goal that day. The activity measurement module 140 can communicate with the gyroscope or heart rate monitor to determine if the user ran over 3 miles an hour for 30 minutes or more, or if the user reached a certain heart rate for 30 minutes or more that day. (See, for example, Wikipedia's Sep. 3, 2019 Gyroscope description at https://en.wikipedia.org/wiki/Gyroscope, and Wikipedia's Sep. 3, 2019 Heart Rate Monitor description at https://en.wikipedia.org/wiki/Heart_rate_monitor, which are herein incorporated by reference in its entirety.) If the activity measurement module 140 determines that the user ran over 3 miles an hour for 30 minutes or reached a certain heart rate for 30 minutes, the electronic charge approval module 120 can approve the user's attempted purchase at the electronic store and/or the physical store.

In addition to the above examples, multiple other types of activities can be monitored and tied to a health goal that needs to be met in order to make a certain pre-defined purchase. For example, a pedometer (or pedometer app) can track steps, stairs climbed, walking distance, speed and routes. (See, for example, Wikipedia's Sep. 3, 2019 Pedometer description at https://en.wikipedia.org/wiki/Pedometer, which describes how a fitness app can track steps, and which is herein incorporated by reference in its entirety.) In addition, a motion capture can track motion data. (See, for example, Wikipedia's Sep. 3, 2019 Motion Capture description at https://en.wikipedia.org/wiki/Motion_capture, which is herein incorporated by reference in its entirety.)

Conclusion

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

In addition, it should be understood that any figures which highlight the functionality and advantages are presented for example purposes only. The disclosed methodology and system are each sufficiently flexible and configurable such that they may be utilized in ways other than that shown. For example, other steps may be provided, or steps may be eliminated, from the described flows, and other components may be added to, or removed from, the described systems. In addition, the steps or components may be used in a different order or configuration than that shown in the drawings.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for allowing an electronic purchase upon completion of an exercise and/or physical activity goal, comprising:
retrieving, at a processor associated with a user device, exercise and/or physical activity goal parameters for a user, wherein the exercise and/or physical activity goal parameters comprise obtaining a predetermined heart rate for a predetermined amount of time on a predetermined day and/or a predetermined time of day;
retrieving, from a database in communication with the processor, electronic charge approval parameters for the user, the electronic charge approval parameters based on the exercise and/or physical activity goal parameters;
measuring, by an electronic measurement system, motion data and/or heart rate date for the user;
based on measured motion data and/or heart rate data, determining, by the processor, that the exercise and/or physical activity goal parameters have been met; and
responsive to receiving a determination that the exercise and/or physical activity goal parameters have been met and the requested electronic charge is within a predetermined price range for a product and/or service from a pre-determined entity, authorizing, by the processor, a requested electronic charge in accordance with the electronic charge approval parameters.

2. The method of claim 1, wherein the exercise and/or physical activity goal parameters comprises walking a predetermined amount of steps within a predetermined amount of time.

3. A computer-implemented system for allowing an electronic purchase upon completion of an exercise and/or physical activity goal, comprising:
a memory storing instructions; and
a processor that, when executing the instructions, is configured for:
retrieving, from a database in communication with the processor, exercise and/or physical activity goal parameters for a user, wherein the exercise and/or physical activity goal parameters comprise obtaining a predetermined heart rate for a predetermined amount of time on a predetermined day and/or a predetermined time of day;
retrieving, from the database, electronic charge approval parameters for the user, the electronic charge approval parameters based on the exercise and/or physical activity goal parameters;

determining whether the exercise and/or physical activity goal parameters for the user have been met using an electronic measurement system, the electronic measurement system measuring motion data and/or heart rate data for the user; and based on the measured motion data and/or measured heart rate data, and price data and/or entity data indicating that the requested electronic charge is within a predetermined price range for a product and/or service from a pre-determined entity, authorizing a requested electronic charge upon a determination that the electronic charge approval parameters for the user have been met.

4. The system of claim 3, wherein the processor is configured for:

declining the requested electronic charge upon a determination that the electronic charge approval parameters have not been met.

5. The system of claim 3, wherein the processor is configured for:

disabling the electronic charge approval parameters upon fulfilment of predetermined disabling criteria.

6. The system of claim 5, wherein the disabling criteria comprises receipt of disabling approval from a designated person and/or designated electronic contact information.

7. The system of claim 6, wherein the designated electronic contact information comprises a phone and/or an email address.

8. The system of claim 6, wherein the designated person comprises a customer service representative.

9. The system of claim 6, wherein the designated person comprises a friend and/or family member of a user.

10. A device for allowing an electronic purchase upon completion of an exercise and/or physical activity goal, comprising:

a database storing instructions; and a processor that, when executing the instructions, is configured for:

retrieving, from the database, exercise and/or physical activity goal parameters for a user, wherein the exercise and/or physical activity goal parameters comprise obtaining a predetermined heart rate for a predetermined amount of time on a predetermined day and/or a predetermined time of day;

retrieving, from the database, electronic charge approval parameters for the user based on the exercise and/or physical activity goal parameters;

determining whether the exercise and/or physical activity goal parameters for the user have been met using metrics measured by an electronic measurement system, the electronic measurement system measuring motion data and/or heart rate data for the user; and based on measured motion data and/or measured heart rate data, and price data and/or entity data indicating that the requested electronic charge is within a predetermined price range for a product and/or service from a pre-determined entity, authorizing a requested electronic charge upon a determination that the electronic charge approval parameters for the user have been met.

11. The device of claim 10, wherein the electronic measurement system is a component and/or a mobile application for a mobile phone device.

12. The device of claim 10, wherein the electronic measurement system is a smart fitness device.

13. The device of claim 10, wherein the exercise and/or physical activity goal parameters comprise walking a predetermined amount of steps within a predetermined amount of time.

* * * * *